United States Patent [19]

Suwa et al.

[11] Patent Number: 4,853,819
[45] Date of Patent: Aug. 1, 1989

[54] OVERCURRENT TRIPPING UNIT FOR A CIRCUIT BREAKER

[75] Inventors: Takeshi Suwa, Osaka; Takafumi Kuroda, Nara, both of Japan

[73] Assignee: Terasaki Denki Sangyo Kabushiki Kaisha, Osaka, Japan

[21] Appl. No.: 195,500

[22] Filed: May 18, 1988

[30] Foreign Application Priority Data

May 22, 1987 [JP] Japan ................................. 62-126390

[51] Int. Cl.$^4$ ............................................. H02H 3/32
[52] U.S. Cl. ........................................ 361/47; 361/42; 361/44; 361/96
[58] Field of Search .................. 361/44, 47, 48, 42, 361/49, 50, 47, 96

[56] References Cited

U.S. PATENT DOCUMENTS

| | | | |
|---|---|---|---|
| 4,347,540 | 8/1982 | Gary et al. | 361/47 |
| 4,380,785 | 4/1983 | Demeyer et al. | 361/96 |
| 4,761,704 | 8/1988 | Fraisse et al. | 361/47 X |

*Primary Examiner*—Todd E. Deboer
*Attorney, Agent, or Firm*—Staas & Halsey

[57] ABSTRACT

In the overcurrent tripping unit for a circuit breaker, current transformers are provided for detecting currents flowing through respective phases of a main circuit, the secondary outputs of the current transformers are star connected, the primary outputs are polyphase full-wave rectified, the voltage drop based on the rectified positive/negative direct output of each phase is directed by first and second resistances to be applied to the control means, and a ground fault current is detected based on the secondary outputs of the current transformers to be applied to the control means.

5 Claims, 6 Drawing Sheets

FIG.1 PRIOR ART
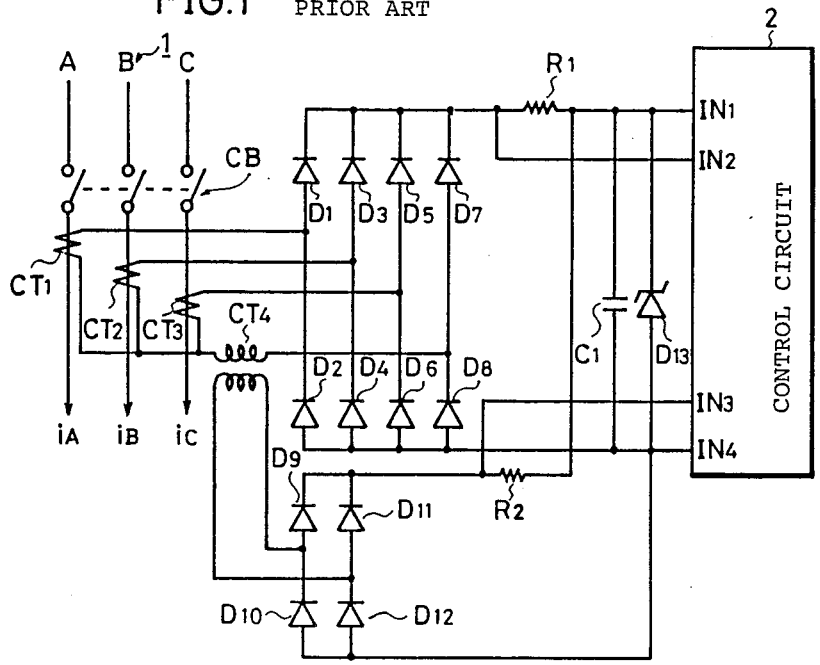
FIG.2A PRIOR ART
CURRENT WAVEFORM
OF EACH PHASE
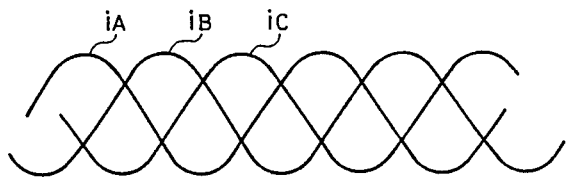
FIG.2B PRIOR ART
VOLTAGE DROP
AT R1

CURRENT WAVEFORM
OF EACH PHASE

VOLTAGE DROP
AT R3

VOLTAGE DROP
AT R4

VOLTAGE DROP
AT R5

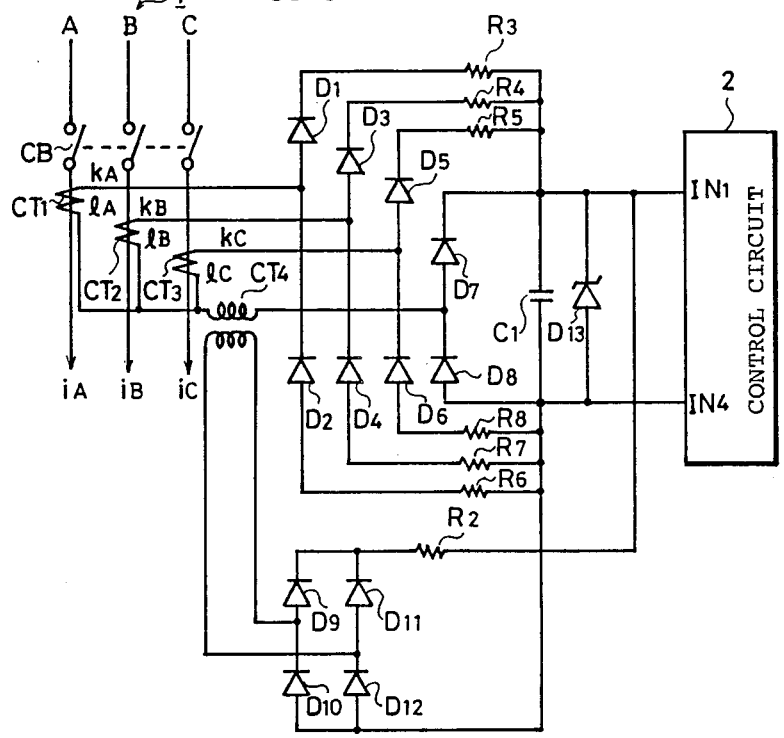
FIG. 9
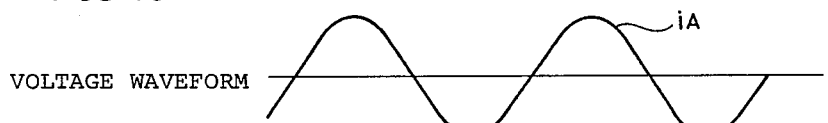
FIG. 10A
VOLTAGE WAVEFORM
FIG. 10B
VOLTAGE DROP AT R3
FIG. 10C
VOLTAGE DROP AT R6

OVERCURRENT TRIPPING UNIT FOR A CIRCUIT BREAKER

BACKGROUND OF THE INVENTION

1. Field of the Invention

The present invention relates generally to an overcurrent tripping unit for a circuit breaker, and more specifically, it relates to an overcurrent tripping unit for a circuit breaker in which the tripping unit operates to break a main circuit when a current flowing in the main circuit exceeds a predetermined set value and a predetermined time condition is satisfied.

2. Description of the Prior Art

FIG. 1 is an electrical circuit diagram of a current detecting portion in a conventional overcurrent tripping unit. Referring to FIG. 1, the structure of a conventional overcurrent tripping unit will be described using a three-pole circuit breaker as an example. A circuit breaker CB is inserted in each phase of the main circuit 1, and current transformers CT1 to CT3 are provided at the output side of the respective circuit breakers CBs. One end of the current transformer CT1 is connected to an anode of a diode D1 and to a cathode of a diode D2; one end of the current transformer CT2 is connected to an anode of a diode D3 and to a cathode of a diode D4; and one end of the current transformer CT3 is connected to an anode of a diode D5 and to a cathode of a diode D6.

The other ends of the current transformers CT1 to CT3 are commonly connected to one end of a primary coil of a current transformer CT4 for detecting the ground fault current. The other end of the primary coil of the current transformer CT4 is connected to an anode of a diode D7 and to a cathode of a diode D8. The current transformer CT4 is to detect the ground fault current. The cathode of each of the diodes D1, D3, D5 and D7 is connected to an IN2 input end of a control circuit 2 as well as to an IN1 input end of the control circuit 2 through a resistance R1. The anode of each of the diodes D2, D4, D6 and D8 is connected to an IN4 input end of the control circuit 2.

The secondary outputs of the current transformer CT4 are connected to the diodes D9 to D12 to be full-wave rectified, with the full-wave rectified output being connected to an IN3 input end of the control circuit as well as the IN1 input end of the control circuit 2 through a resistance R2. A smoothing capacitor C1 and a voltage regulating diode D13 are connected in parallel between the IN1 input end and the IN4 input end of the control circuit 2. The combination of a resistance, a voltage regulating diode and a transistor may be used instead of the voltage regulating diode D13 to form a constant voltage circuit.

A semiconductor trip circuit such as disclosed in U.S. Pat. No. 4,380,785 is contained in the control circuit 2. The semiconductor trip circuit has a delayed releasing characteristic, that is the circuit breaker CB is broken within a predetermined time period when a current flowing in the main circuit 1 exceeds a predetermined permissible current, and an instant releasing characteristic, that is, the circuit breaker CB is broken instantly when the current flowing in the main circuit 1 exceeds a higher predetermined value.

FIGS. 2A and 2B are diagrams of waveforms showing the waveforms of the current flowing in the main circuit of FIG. 1 and the rectified and composite secondary currents of this current.

The operation of the current detecting portion of the overcurrent tripping unit shown in FIG. 1 will be described with reference to FIGS. 2A and 2B. The phases of the currents $i_A$, $i_B$ and $i_C$ respectively flowing in the phases A, B and C of the main circuit 1 are shifted from each other by 120° as shown in FIG. 2A. The currents of the respective phases detected by the current transformers CT1 to CT3 are full-wave rectified by the diodes D1 to D6 and, consequently, a voltage drop such as shown in FIG. 2B is generated at both ends of the resistance R1. More specifically, the voltage drop generated at the resistance R1 of FIG. 1 is consisted by the sum of the forward direction component of the CT secondary current of the currents $i_A$, $i_B$ and $i_C$ of the respective phases. If the waveform of the current is perfectly sinusoidal, an effective value can be obtained by setting the voltage peak value at $1/\sqrt{2}$. On this occasion, the current flowing in the secondary side of the current transformer CT4 is 0 as long as there is no accidental grounding.

However, recently a number of power electronics devices such as an inverter and a thyristor control unit are used as loads of the main circuit 1, so that the waveform of the current has been deformed. Therefore, the control can not be carried out based on the current value corresponding to the effective value of the respective phase currents $i_A$, $i_B$ and $i_C$ when the current peak only is detected in the above described manner. In order to eliminate the disadvantage, the independent detection of the currents $i_A$, $i_B$ and $i_C$ of respective phase becomes necessary.

FIG. 3 is an electrical circuit diagram of the current detecting portion of an overcurrent tripping unit in which the current of each phase can be detected. FIGS. 4A to 4D are waveforms of respective portions shown in FIG. 3.

Referring to FIG. 3, as in the above described FIG. 1, a circuit breaker CB and current transformers CT1 to CT3 are inserted in the main circuit 1. One end $k_A$ of the current transformer CT1 is connected to an anode of a diode D1 and to a cathode of a diode D2, while the other end $l_A$ is connected to an anode of a diode D14 and to a cathode of a diode D15. The output of the current transformer CT1 is full-wave rectified by these diodes D1, D2, D14 and D15 to be applied to a control circuit 2 through a resistance R3.

One end $k_B$ of the current transformer CT2 is connected to an anode of a diode D3 and to a cathode of a diode D4, while the other end $l_B$ is connected to an anode of the diode D16 and to a cathode of the diode D17. The output of the current transformer CT2 is full-wave rectified by these diodes D3, D4, D16 and D17 to be applied to the control circuit 2 through a resistance R4. Similarly, one end $k_C$ of the current transformer CT3 is connected to an anode of a diode D5 and to a cathode of a diode D6, while the other end $l_C$ is connected to an anode of a diode D18 and to a cathode of a diode D19. The output of the current transformer CT3 is full-wave rectified by these diodes D5, D6, D18 and D19 to be applied to the control circuit 2 through a resistance R5.

By the above described structure, when respective phase currents $i_A$, $i_B$ and $i_C$ flow in the respective phases of A, B and C as shown in FIG. 4A, then voltage drops such as shown in FIGS. 4B to 4D are generated at the resistances R3, R4 and R5.

Now, a problem in the circuit shown in FIG. 3 is the detection of the ground fault current. In the example shown in FIG. 1, the other ends of the current transformers CT1 to CT3 are respectively short-circuited, while in the example shown in FIG. 3, the other ends $l_A$ to $l_C$ of the current transformers CT1 to CT3 are not short-circuited. If the other ends $l_A$ to $l_C$ of the current transformers CT1 to CT3 are short-circuited, the voltage drop at the resistances R3, R4 and R5 will not have the waveforms shown in FIGS. 4B to 4D.

As for the path in which the current flowing out from the other end $l_A$ of the current transformer CT1 returns to one end $k_A$ of the current transformer CT1 in the A phase, in FIG. 3, the current flows from the other end $l_A$ of the current transformer CT1→diode D14→resistance R3→control circuit 2→diode D2 to the one end $k_A$ of the current transformer CT1, with all currents passing through the resistance R3, therefore there is no problem. However, if the other ends $l_A$ to $l_C$ of the current transformers CT1 to CT3 are short circuited two by-passes are formed beside the above path, namely, the other end $l_A$ of the current transformer CT1→diode D16 through the other end $l_B$ of the current transformer 2→resistance R4→control circuit 2→diode D2→one end $k_A$ of the current transformer CT1, and, the other end $l_A$ of the current transformer CT1→diode D18 through the other end $l_C$ of the current transformer CT3→resistance R5→control circuit 2→diode D2→one end $k_A$ of the current transformer CT1. Consequently, the current also flows through the resistances R4 and R5, so that the voltage drop at the resistance R3 is not proportional to the current $i_A$ flowing in the A phase. For this reason, in the example shown in FIG. 3, the current transformer for detecting the ground fault current such as shown in the above FIG. 1 can not be connected. The configuration shown in FIG. 5 must be employed to incorporate the current transformer for detecting the ground fault current.

FIG. 5 is an electric circuit diagram showing one example of a current detecting portion in an overcurrent tripping unit having a current transformer for detecting the ground fault current incorporated therein. FIG. 6 shows the relation between the current flowing in the main circuit and the output current of the current transformer in FIG. 5.

The circuit shown in FIG. 5 is the same as that shown in FIG. 3 except the following points. Namely, the other end $l_A$ of the current transformer CT1 is connected to the anode of the diode D14 and to the cathode of the diode D15 through a primary coil $m_A$ of the current transformer CT5 for detecting the ground fault current. The end $l_B$ of the current transformer CT2 is connected to the anode of the diode D16 and to the cathode of the diode D17 through the current transformer CT5 for detecting the ground fault current. In addition, the other end $l_C$ of the current transformer CT3 is connected to the anode of the diode D18 and to the cathode of the diode D19 through a primary coil $m_C$ of the current transformer CT5 for detecting the ground fault current. The secondary coil of the current transformer 5 for detecting the ground fault current is connected to a full-wave rectifying circuit comprising diodes D9 to D12, with the full-wave rectified voltage applied to the control circuit 2 through the resistance R2.

In the example shown in FIG. 5, the voltage drop corresponding to the currents flowing through the respective phases A to C are generated at the resistances R3 to R5 and the ground fault current can be detected by the current transformer CT5. However, three coils are required as the primary coils of the current transformer CT5 for detecting the ground fault current. In the four-pole circuit breaker which breaks not only the voltage lines but also the neutral line, four coils are required, enlarging the size of the current transformer CT5 for detecting the ground fault current.

In the current transformer CT4 for detecting the ground fault current shown in FIG. 1, no current flows through the primary coil unless an accidental grounding happens. However, in the current transformer CT5 for detecting the ground fault current shown in FIG. 5, the secondary currents of the current transformers CT1 to CT3 are always flowing through the primary coil of the current transformer CT5. Generally, the set value of the ground fault current is about 10 to 40% of the rated value of the currents $i_A$ to $i_C$ flowing through the main circuit 1 and, when the ground protection circuit is activated, the circuit breaker CB must be operated in several 100 m sec. Therefore, if there is no ground fault current flowing as shown in FIG. 1, the sectional area of the strand of the primary coil of the current transformer CT4 for detecting the ground fault current is permissible to be smaller than the sectional area of the strand of the secondary coils of the current transformers CT1 to CT3 in the main circuit. In other words, thin strands can be used. However, if the secondary current of the main circuit 1 always flows to the primary coils $m_A$ to $m_C$ of the current transformer CT5 for detecting the ground fault current, the sectional area of the strand of the primary coils $m_A$ to $m_C$ of the current transformer CT5 for detecting the ground fault current must be equal to the sectional area of the strand of the secondary coils of the current transformers CT1 to CT3 in the main circuit. For this reason, besides the increase of the number of the primary coils $m_A$ to $m_C$ such as described in the foregoing, there is a disadvantage that each coil becomes large.

In addition, even if there is no accidental grounding, the current constantly flows through the primary coils $m_A$ to $m_C$ of the current transformer CT5 for detecting the ground fault current, so that, viewed from the current transformers CT1 to CT3 in the main circuit 1, the primary coils $m_A$ to $m_C$ of the current transformer CT5 for detecting the ground fault current become a burden even when there is no accidental grounding. More specifically, even if there is no accidental grounding, the outputs of the current transformers CT1 to CT3 are as shown in FIG. 6.

Namely, assuming that the ideal curve of the relation between the main circuit current and the outputs of the current transformers CT1 to CT3 obtained from the calculation is represented by a, it becomes as shown by the curve b when current transformer CT5 for detecting the ground fault current is not provided (the case shown in FIG. 3) and it becomes as represented by the curve c when the current transformer CT5 for detecting the ground fault current is provided, owing to the current transformer CT5. Due to the characteristics shown in FIG. 6, the error to the instantaneous current setting (usually four times to sixteen times of the rated value of the current transformers CT 1 to CT3) differs dependent on whether the ground fault protection is provided or not. Consequently, circuits of different designs are required for each specification. In addition, if the instantaneous current setting becomes near fifteen times the rated value of the current transformer, the outputs of the current transformer CT1 to CT3 become saturated for the characteristics, so that the set precision itself is degraded.

Meanwhile, in FIG. 1, no current flows through the current transformer CT4 for detecting the ground fault current unless an accidental grounding occurs. Namely, the current transformer CT4 for detecting the ground fault current is not a burden for the current transformers CT1 to CT3 of the main circuit, so that it has no such problem as described above.

FIGS. 7 and 8 are electric circuit diagrams showing other examples of the current detecting portions in a conventional overcurrent releasing apparatus.

In the prior art shown in FIGS. 3 and 5, the current of each phase is independently detected. In the example shown in FIG. 7, the current of each phase is not independently detected but the detected voltage of each of the current transformers CT1 to CT3 are full-wave rectified by bridge rectifying diodes D21 to D23, with the respective rectified outputs being overlapped with each other to be applied to the control circuit 2. The relation between the current flowing through the main circuit 1 and the voltage drop at the resistance R1 in the example of FIG. 7 is as the same as in the circuit shown in FIG. 1.

In order to detect the ground fault current in the circuit shown in FIG. 7, the configuration of FIG. 8 is required. Namely, the connection between the primary coil of the current transformer CT5 for detecting the ground fault current and respective current transformers CT1 to CT3 as the same as shown in FIG. 5, and the secondary coil is connected to a bridge rectifying diode D24. In this example also, three coils are required as the primary coils of the current transformer CT5 for detecting the ground fault current, enlarging the current transformer CT5 for detecting the ground fault current.

SUMMARY OF THE INVENTION

Therefore, an object of the present invention is to provide an overcurrent tripping unit for a circuit breaker in which a current transformer for detecting a ground fault current can be employed, which current transformer has one primary coil and presents no burden on the current transformers of the main circuit when there is no ground fault current flowing.

Another object of the present invention is to provide an overcurrent tripping unit for a circuit breaker in which the current of each phase can be independently detected.

Briefly stated, the present invention comprises an overcurrent tripping unit for a circuit breaker which operates to break main circuit when the current flowing through the main circuit exceeds a predetermined set value and a predetermined condition is satisfied, wherein the secondary output of the current transformer are star connected to detect the current flowing in the respective phases of the main circuit, the secondary outputs of the current transformers are polyphase full-wave rectified, the voltage drops respectively generated at first and second resistance are applied to a control circuit as outputs based on the positive-negative rectified output of the respective phase, and a ground fault current is applied to the control circuit based on the secondary outputs of the current transformers, whereby the current of each phase can be independently detected with the current detecting means presenting no burden on the current transformers of the main circuit.

Therefore, in accordance with the present invention, the current of each phase can be independently detected without employing a large current transformer for detecting the ground fault current as in the conventional case.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic diagram of a current detecting portion in a conventional overcurrent tripping unit;

FIGS. 2A and 2B are waveforms of the current flowing through the main circuit shown in FIG. 1 and of the composite current;

FIG. 9 is a schematic diagram of one embodiment of the present invention;

FIGS. 10A to 10C are waveforms of each of the portions of the electric circuit shown in FIG. 9.

DESCRIPTION OF THE PREFERRED EMBODIMENTS

Figure 3:
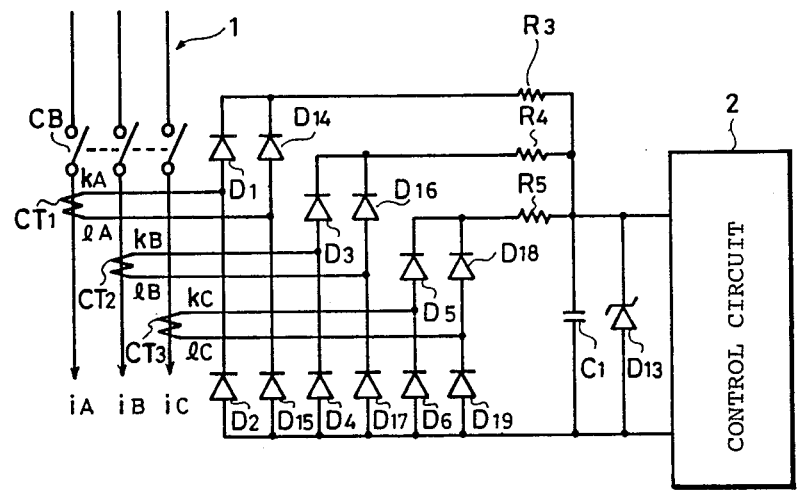
FIG. 3 is a schematic diagram showing another example of the current detection portion in a conventional overcurrent tripping unit.
Figure 4A:
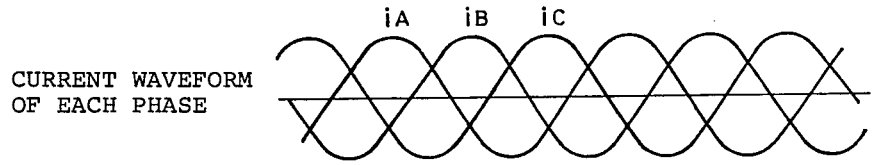
FIGS. 4A to 4D are waveforms of each of the portions shown in FIG. 3.
Figure 4B:
Figure 4C:
Figure 4D:
Figure 5:
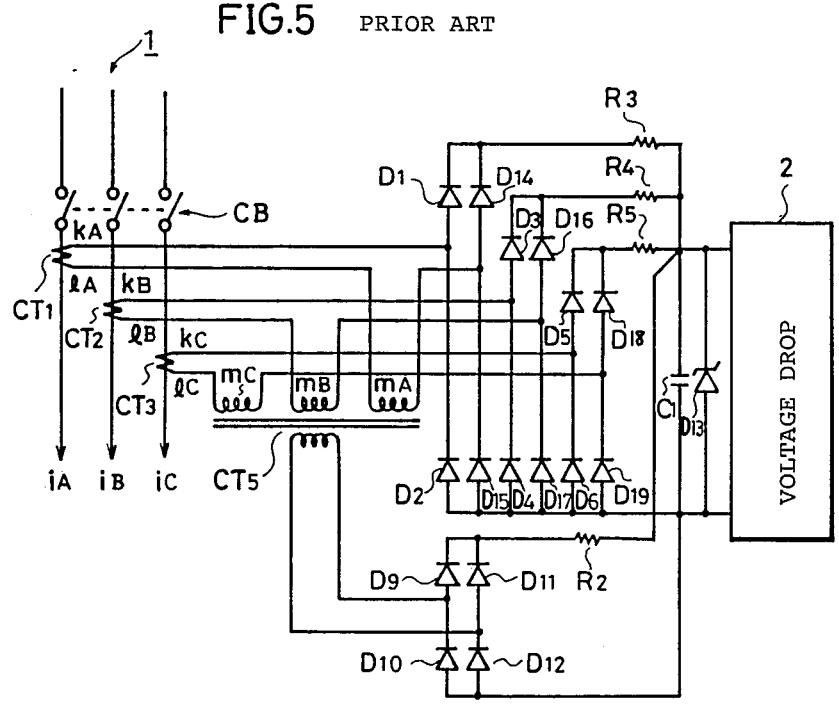
FIG. 5 is a schematic diagram showing a further example of the current detecting portion in a conventional overcurrent tripping unit.
Figure 6:
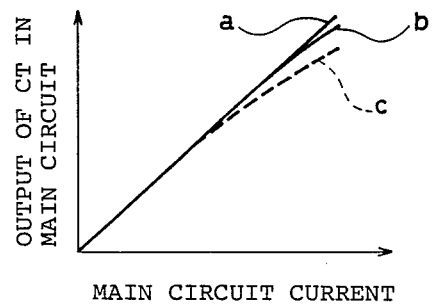
FIG. 6 shows the relation between the current flowing through the main circuit and the output current of the current transformer shown in FIG. 5.
Figure 7:
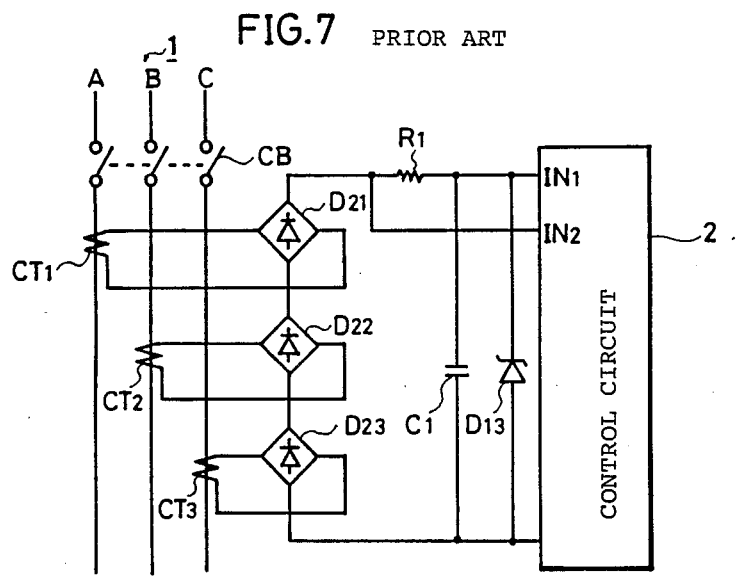
FIGS. 7 and 8 are schematic diagrams showing still further examples of the current detecting portions in a conventional overcurrent tripping unit.
Figure 8:
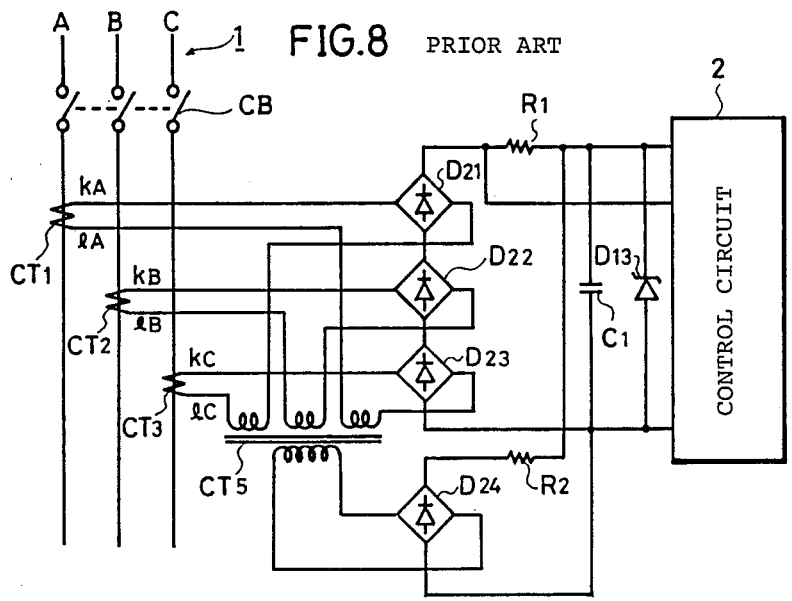

FIG. 9 is a schematic diagram showing one embodiment of the present invention. The structure of one embodiment of the present invention will be described in the following with reference to FIG. 9. As in the conventional case, a circuit breaker CB and current transformers CT1 to CT3 are incorporated in the main circuit 1. One end $k_A$ of the current transformer CT1 is connected to the anode of the diode D1 and to the cathode of the diode D2, one end $k_B$ of the current transformer CT2 is connected to the anode of the diode D3 and to the cathode of the diode D4, and one end $k_C$ of the current transformer CT3 is connected to the anode of the diode D5 and to the cathode of the diode D6. The other end $l_A$ of the current transformer CT1, the other end $l_B$ of the current transformer CT2 and the other end $l_C$ of the current transformer CT3 are commonly connected to one end of a primary coil of the current transformer CT4 for detecting the ground fault current. The other end of the primary coil of the current transformer CT4 for detecting the ground fault current is connected to the anode of the diode D7 and to the cathode of the diode D8.

The cathode of the diode D1 is connected to one end of the resistance R3, the cathode of the diode D3 is connected to one end of the resistance R4 and the cathode of the diode D5 is connected to one end of the resistance R5. The other ends of the resistances R3, R4 and R5 are commonly connected to the IN1 input end of the control circuit 2. The anode of the diode D2 is connected to one end of the resistance R6, the anode of the diode D4 is connected to one end of the resistance R7 and the anode of the diode D6 is connected to one end of the resistance R8. The other ends of the resistances R6, R7 and R8 are commonly connected to the IN4 input end of the control circuit 2. The resistances R3, R4 and R5 constitute a first resistance means while resistances R6, R7 and R8 constitute a second resistance means.

A smoothing capacitor C1 and a voltage regulating diode D13 are connected in parallel between the IN1 input end and the IN4 input end of the control circuit 2. The secondary coil of the current transformer CT4 for detecting the ground fault current is connected to a full-wave rectifying circuit constituted by the diodes D9 to D12, with the rectified output being connected to the IN1 input end of the control circuit 2 through the resistance R2.

FIG. 10A to 10C are waveforms of each of the portions of the electric circuit shown in FIG. 9.

The definite operation of one embodiment of the present invention will be described with reference to FIGS. 9 and 10A to 10C. If a current $i_A$ such as shown in FIG. 10A appears in the A phase of the main circuit 1, and the current polarity is positive, the current flows through the path such as follows, namely, one end $k_A$ of the current transformer CT1→diode D1→resistance R3→control circuit 2→diode D8→current transformer CT4 for detecting the ground fault current→one end $l_A$ of the current transformer CT1, and a voltage drop such as shown in FIG. 10B is generated at the resistance R3. When the polarity of the current flowing in the A phase of the main circuit 1 becomes negative, the current flows through the path such as follows, namely, the other end $l_A$ of the current transformer CT1→the current transformer CT4 for detecting the ground fault current→diode D7→control circuit 2→resistance R6→diode D2→one end $k_A$ of the current transformer CT1, and a voltage drop such as shown in FIG. 10C is generated at the resistance R6.

If a current $i_B$ flows through the B phase of the main circuit 1, the voltage drops are generated at the resistances R4 and R7 in the similar manner as described above, and if a current $i_C$ flows through the C phase in the main circuit 1, the voltage drops are generated respectively at the resistances R5 and R8.

In this case, the CT4 secondary current of the respective phases A, B and C commonly flow through the primary coil of the current transformer CT4 for detecting the ground fault current, so that the composite current becomes 0. In other words, no current flows through the current transformer CT4 for detecting the ground fault current unless an accidental grounding occurs, so that the voltage drop responsive to the positive/negative output can be generated for each phase by each of the resistances R3 to R8 so as to be applied as the inputs to the control circuit 2.

Figure 11:
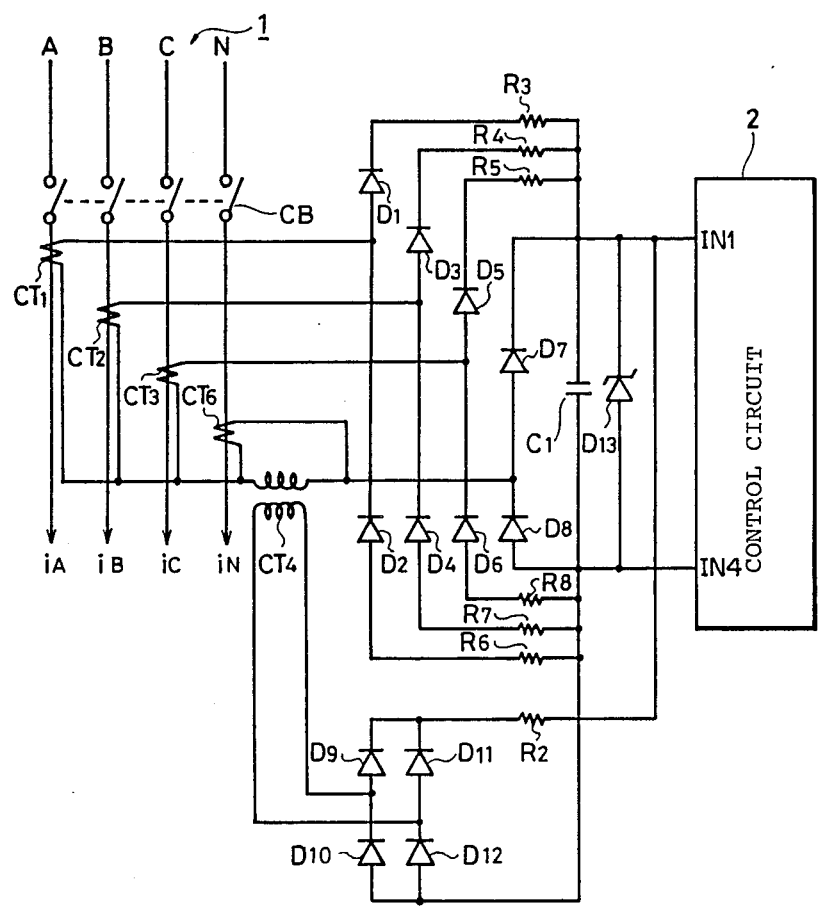
FIG. 11 is a schematic diagram of another embodiment of the present invention.

FIG. 11 is a schematic diagram showing another embodiment of the present invention. In the embodiment shown in FIG. 11, the main circuit 1 has the four-line structure comprising respective phase voltage lines A, B and C and a neutral line N, wherein a current transformer CT6 is inserted in the neutral line N and the other end of the current transformer CT4 for detecting the ground fault current and the current transformer CT6 are connected in series. Other structures are the same as the embodiment of FIG. 1. As described above, by forming an overcurrent tripping unit with four lines and by composing a current from an output current of the current transformer CT6 provided on the neutral line N and the currents flowing through the neutral lines of the star connected current transformers CT1, CT2 and CT3, the ground fault current can be detected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An overcurrent tripping unit for a circuit breaker which operates to break a main circuit when a main current flowing through the main circuit exceeds a predetermined set value and a predetermined time condition is satisfied, comprising:
    control means for activating the circuit breaker;
    current transformer means, having secondary outputs from star connected secondary sides, for detecting the main current flowing through each phase of the main circuit;
    a plurality of rectifying means, each having an output terminal outputting a positive/negative direct voltage, for rectifying a corresponding phase of one of the secondary outputs of said current transformer means to provide multiphase full-wave rectifying;
    a plurality of resistance means, respectively connected to the output terminal of one of said rectifying means, for detecting, independently of others of said resistance means, current in the corresponding phase of the one of the secondary outputs of said current transformer means and for applying a phase current signal to said control means; and
    ground fault current detecting means for detecting the ground fault current from a composite of the secondary outputs of said current transformer means for all phases to apply a ground fault signal to said control means.

2. An overcurrent tripping unit for a circuit breaker according to claim 1, wherein
    the main circuit has three phases and said current transformer means includes secondary outputs for each of the three phases, and
    said ground fault current detecting means comprises detection means for detecting a ground fault current flowing through the common node of the star connected secondary sides of said current transformer means.

3. An overcurrent tripping unit for a circuit breaker according to claim 1, wherein
    the main circuit comprises three phase voltage lines and a neutral line,
    said current transformer means comprises star connected current transformers, each outputting a secondary side output current, respectively provided for the three phase voltage lines and the neutral line; and
    said ground fault current detecting means comprises detection means for detecting a ground fault current composed of the secondary side output current of the one of said current transformers provided for the neutral line and a common node current flowing through the common node of said star connected current transformers.

4. An overcurrent tripping unit for a circuit breaker according to claim 2, wherein said detection means comprises:
- a ground fault current transformer having a primary coil directly connected to the common node of the star connected secondary sides of said current transformer means and having a secondary coil; and
- full-wave rectifying means, connected between the secondary coil of said ground fault current transformer and said control means, for rectifying current flowing through the secondary coil of said ground fault current transformer.

5. An overcurrent tripping unit for a circuit breaker according to claim 3, wherein said detection means comprises:
- a ground fault current transformer having a primary coil directly connected to the common node of the star connected secondary sides of said current transformer means and having a secondary coil; and
- full-wave rectifying means, connected between the secondary coil of said ground fault current transformer and said control means, for rectifying current flowing through the secondary coil of said ground fault current transformer.

* * * * *